UNITED STATES PATENT OFFICE.

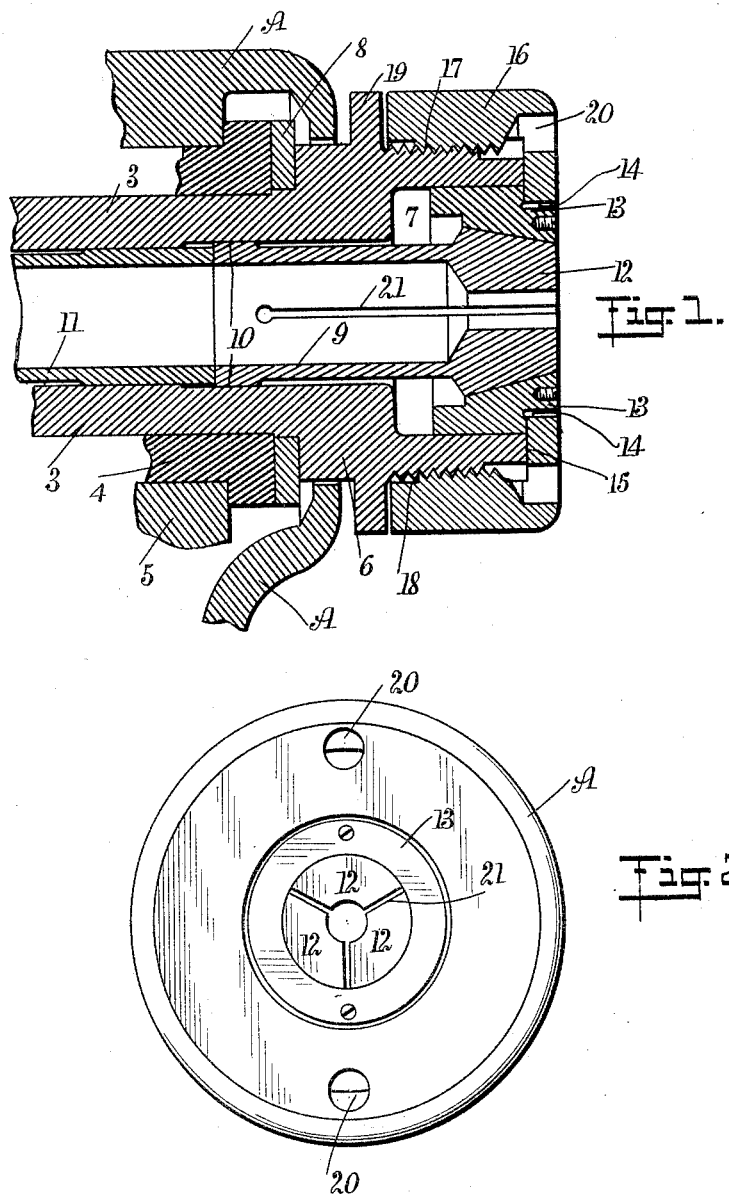

DAVID WILSON WOOD, OF BRAZIL, INDIANA.

AUTOMATIC CHUCK.

1,081,183.  Specification of Letters Patent.  Patented Dec. 9, 1913.

Application filed May 9, 1912.  Serial No. 696,091.

*To all whom it may concern:*

Be it known that I, DAVID WILSON WOOD, a citizen of the United States, and a resident of Brazil, in the county of Clay and State of Indiana, have invented a new and Improved Automatic Chuck, of which the following is a full, clear, and exact description.

My invention relates to an automatic chuck and particularly relates to a holder to be used on turret lathes, screw machines, or wherever an automatic chuck with a changeable collet is desired.

In the old form of chucks in which the holder is screwed on to a threaded spindle, the rear face of the chuck is so far removed from the front work-carrying portion of the chuck, that any slight variation from a true engagement with the spindle would cause the front part of the chuck and the work carried thereby, to be materially off-centered. Due to the frequent detaching of the chuck from the threaded spindle and the chuck bearing on said spindle, a loose connection is made resulting in a material wabbling which would throw the work out of true, causing extra operations. In regard to the old style of chuck, it is noted that it is necessary to temper the same, the heating operation of which frequently distorts the regularity of the threads, which causes the chuck to bind unevenly and often results in the off-centering of the chuck and the work carried thereby.

I eliminate the above-noted objections by slidably mounting the collet in the spindle and centering the collet by a master, which master is in turn controlled by a hood in screw-threaded engagement with the spindle. By this construction, the engagement of the hood with the spindle may be disalined or worn without in any way affecting the alinement of the collet itself.

Reference is to be had to the accompanying drawings, forming a part of this specification, in which similar characters of reference indicate corresponding parts in both the figures, and in which—

Figure 1 is a vertical transverse sectional view showing a preferred embodiment of my invention, and Fig. 2 is an outside end view of the same.

Referring more particularly to Fig. 1, I have shown a hollow revolving member or spindle 3 driven from any suitable source, and shown mounted in bearings 4, which bearings are in turn supported by a bracket 5 forming part of the framework of the machine A. The working end of the spindle is preferably enlarged to form a head 6, the outer end of which head is recessed to form a pocket 7 concentrically disposed relative to the bore of the spindle 3. If desired, a thrust collar 8 is interposed between the head 6 and the bearings 4.

Slidably mounted within the outer end of the bore of the spindle and extending into the pocket 7, is a bored collet 9, which collet is rotated by the rotating spindle through a splined connection 10, and this collet is adapted to be ejected from the spindle by means of a rear plunger 11, which plunger also acts to maintain the collet in engagement with the master hereinafter described. The collet is of general cylindrical construction, the outer end of which is formed into a frusto-conical nose 12, extending from the outer edge of which nose longitudinally a material distance of the same, is a plurality of slots 21, shown in the illustration to be three in number. These slots permit the collapsing of the collet when forced into engagement with the master, to engage the work held between the parts of the nose 12.

Slidably mounted within the pocket 7 and conforming substantially to the configuration of the same and concentrically disposed relative to the collet 9, is a collet master 13. This master has a centrally disposed frusto-conical bore adapted to engage the outside face of the nose 12, so that a movement of the master into the pocket 7 will cause the collapsing of the parts of the nose 12 and engage the work held therebetween.

In order to force the collet master into engagement with the split nose 12, the front recessed face 14 of the master is engaged by the inner front face 15 of a hood 16, which hood is of a general cylindrical form internally screw-threaded at 17, which threads engage external threads 18 on the head 6. The movement of this hood is eliminated because the spindle 6 contacts with the front recessed face 14 at the inner front face 15 of the hood 16. In order to rotate the hood on the spindle, the hood may be provided with a pair of diametrically spaced-apart keyholes 20 adapted to be engaged by a suitable lever key.

By the above outlined construction, it will be seen that the collet is rotated by the spindle 3 due to the splined connection there-with, but, at the same time, it may be readily ejected from the spindle by the plunger 11 after the hood 16 has been removed, and a new collet may be inserted, or other work may be inserted in the old collet. As the hood 16 is not directly in engagement with the collet, it is immaterial whether or not the threads 17 and 18 are true, as any irregularity in this threaded connection would have no influence on the axial movement of the master in the pocket 7. The collet master necessarily has a true movement parallel to the axis of the spindle, and so long as the outer face of the nose 12 and the inner bore of the collet master make true fits, it is immaterial what wearing action takes place between the hood and spindle. In other words, as the movement between the master and the spindle is a sliding movement, and the movement between the master and the collet is a sliding movement, there cannot be more wear on one side than on the other, so that having once centered the chuck, it will remain centered.

In chucking and rechucking work the master remains against the shoulder of the hood 16 and does not move back and forth in opening the chuck to feed the stock through. But the collet being sprung gives a tension on the nose so that when the latter is released it will shove back from the master 13 causing the work to be freed and permitting the nose to be moved forward for another operation, the collet being limited in its backward movement so that it will have a tension against the master 13 to hold it against the hood 16.

Having thus described my invention, I claim as new and desire to secure by Letters Patent:

1. A chuck comprising a hollow rotating spindle having a pocket at one end, a collet master slidably mounted in said pocket, said collet master having a frusto-conical bore concentrically disposed relative to the axis of said spindle, a collet slidably mounted in said spindle and having a frusto-conical split nose disposed within the bore of said master, and a hood in screw-threaded engagement with said spindle and bearing on said master to force the same into said pocket, thereby to collapse the nose of said collet, whereby the latter may grip the work carried thereby.

2. A chuck comprising a rotatable spindle, a collet rotated by said spindle, a master engaging said collet, and means carried by the spindle and independent of said collet, acting on said master to center said collet in said spindle.

3. In combination, a hollow spindle having an enlarged head at one end thereof, said head having a bore communicating with the bore of said spindle and concentrically disposed relative to the axis thereof, a cylindrical master fitting within the bore of said head, said master having a bore centrally disposed therein, said bore having an inclined wall, a collet mounted within the bore of said spindle, said collet having a nose fitting the bore of said master, and means in screw-threaded engagement with said spindle, engaging said master to hold the same in engagement with said collet.

4. A chuck comprising a rotating spindle, a split nose collet carried by said spindle, a member encompassing the split nose of said collet, and a member in screw-threaded engagement with said spindle, acting through said first-mentioned member to collapse the nose of said collet, thereby to bind the work in the same.

In testimony whereof I have signed my name to this specification in the presence of two subscribing witnesses.

DAVID WILSON WOOD.

Witnesses:
CYNTHIA BURKE,
JAMES A. McNUTT.